United States Patent
Zeng

(10) Patent No.: US 10,908,810 B2
(45) Date of Patent: *Feb. 2, 2021

(54) METHOD FOR SLIDING RESPONSE ACCELERATION AND RELATED PRODUCTS

(71) Applicant: Guangdong Oppo Mobile Telecommunications Corp., Ltd., Guangdong (CN)

(72) Inventor: Yuanqing Zeng, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,558

(22) Filed: Oct. 3, 2018

(65) Prior Publication Data

US 2019/0034078 A1   Jan. 31, 2019

Related U.S. Application Data

(63) Continuation of application No. PCT/CN2017/086448, filed on May 27, 2017.

(30) Foreign Application Priority Data

May 31, 2016   (CN) .......................... 2016 1 0382737

(51) Int. Cl.
   *G06F 3/0488*   (2013.01)
   *G06F 1/3206*   (2019.01)
   (Continued)

(52) U.S. Cl.
   CPC .......... *G06F 3/04883* (2013.01); *G06F 1/324* (2013.01); *G06F 1/3206* (2013.01);
   (Continued)

(58) Field of Classification Search
   CPC .. G06F 3/04883; G06F 3/0488; G06F 1/3206; G06F 1/324; G06F 1/3243;
   (Continued)

(56) References Cited

U.S. PATENT DOCUMENTS

| 5,451,892 A | * | 9/1995 | Bailey | G06F 1/206 |
| | | | | 327/113 |
| 6,510,400 B1 | * | 1/2003 | Moriyama | G06F 1/206 |
| | | | | 361/679.46 |

(Continued)

FOREIGN PATENT DOCUMENTS

| CN | 101030095 | * | 9/2007 | ............... G06F 1/32 |
| CN | 101030095 A | | 9/2007 | |

(Continued)

OTHER PUBLICATIONS

International search report issued in corresponding international application No. PCT/CN2017/086448 dated Aug. 21, 2017.

(Continued)

*Primary Examiner* — Eric J Yoon

(57) ABSTRACT

A method for sliding response acceleration and related products are provided. The method includes the following operations. A sliding operation of a user on a touch screen is monitored. A first sliding distance of the sliding operation is determined. A sliding acceleration strategy is launched when the first sliding distance exceeds a first preset distance, where the sliding acceleration strategy includes improving performance of a central processing unit (CPU).

16 Claims, 5 Drawing Sheets

(51) Int. Cl.
- *G06F 1/324* (2019.01)
- *G06F 1/3231* (2019.01)
- *G06F 1/3234* (2019.01)
- *G06F 1/3287* (2019.01)
- *G06F 3/0485* (2013.01)

(52) U.S. Cl.
CPC .......... *G06F 1/3231* (2013.01); *G06F 1/3243* (2013.01); *G06F 1/3287* (2013.01); *G06F 3/0485* (2013.01); *G06F 2203/04808* (2013.01)

(58) Field of Classification Search
CPC ...... G06F 1/206; G06F 1/3231; G06F 1/3287; G06F 3/0485; G06F 2203/4808; G09G 2330/02; G09G 2330/021

See application file for complete search history.

(56) References Cited

U.S. PATENT DOCUMENTS

| | | | |
|---|---|---|---|
| 2010/0097342 A1* | 4/2010 | Simmons | G06F 3/0416 345/174 |
| 2014/0267101 A1 | 9/2014 | Fujistu | |
| 2018/0046366 A1* | 2/2018 | Li | G06F 3/0488 |
| 2018/0203566 A1* | 7/2018 | Kawasaki | G06F 3/0488 |

FOREIGN PATENT DOCUMENTS

| | | |
|---|---|---|
| CN | 101950235 A | 1/2011 |
| CN | 102819352 A | 12/2012 |
| CN | 103699577 A | 4/2014 |
| CN | 104169859 A | 11/2014 |
| CN | 104423533 A | 3/2015 |
| CN | 104536680 A | 4/2015 |
| CN | 104811563 A | 7/2015 |
| EP | 2685632 A2 | 1/2014 |
| EP | 2824551 A1 | 1/2015 |
| WO | 2015120705 A1 | 8/2015 |

OTHER PUBLICATIONS

Extended European search report issued in corresponding European application No. 17805798.0 dated Mar. 1, 2019.

* cited by examiner

METHOD FOR SLIDING RESPONSE ACCELERATION AND RELATED PRODUCTS

CROSS-REFERENCE TO RELATED APPLICATION(S)

This application is a continuation of International Application No. PCT/CN2017/086448, filed on May 27, 2017, which claims priority to Chinese Patent Application No. 201610382737.3, filed on May 31, 2016, the disclosures of which are hereby incorporated by reference in their entireties.

TECHNICAL FIELD

This disclosure relates to the technical field of computer, and more particularly to a method for sliding response acceleration and related products.

BACKGROUND

With the popularity of terminal device(s) having a touch screen, a sliding operation by dragging and dropping a finger up, down, left, or right on multiple application windows of the terminal device has become a standard screen scrolling operation mode.

SUMMARY

According to a first aspect of the disclosure, a method for sliding response acceleration is provided. The method includes the following operations.

A sliding operation of a user on a touch screen is monitored. A first sliding distance of the sliding operation is determined. A sliding acceleration strategy is launched when the first sliding distance exceeds a first preset distance, where the sliding acceleration strategy is associated with improving performance of a central processing unit (CPU).

According to a second aspect of the disclosure, a terminal device is provided. The terminal device includes a touch sensor, a processor, and a memory. The processor is configured to execute any of the methods described in the implementations of the disclosure.

According to a third aspect of the disclosure, a computer readable storage medium is provided. The computer readable storage medium is configured to store computer programs which, when executed by a processor, causes the processor to carry out actions of: monitoring a sliding operation of a user on a touch screen; monitoring a sliding operation of a user on a touch screen; determining a first sliding distance of the sliding operation according to the position coordinate acquired; launching a sliding acceleration strategy when the first sliding distance exceeds a first preset distance, the sliding acceleration strategy comprising improving performance of a central processing unit (CPU).

BRIEF DESCRIPTION OF THE DRAWINGS

To illustrate technical solutions embodied by the implementations of the present disclosure more clearly, the following briefly introduces the accompanying drawings required for describing the implementations. Apparently, the accompanying drawings in the following description merely illustrate some implementations of the present disclosure. Those of ordinary skill in the art may also obtain other drawings based on these accompanying drawings without creative efforts.

DETAILED DESCRIPTION

To illustrate objectives, technical solutions, and advantages embodied by the implementations of the present disclosure more clearly, the following further describes the present disclosure in detail with reference to the accompanying drawings. It is evident that the implementations described herein constitute merely some rather than all of the implementations of the disclosure, and that those of ordinary skill in the art will be able to derive other implementations based on these implementations without making inventive efforts, which all such derived implementations shall all fall in the protection scope of the disclosure.

The terms "first", "second", and "third" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

When a user slides a screen through a touch screen, the content of the screen will be updated. The process of updating the content of the screen may include: a system process receives a sliding operation of the user and sends a sliding operation message to a corresponding application process; the application process redraws window contents according to the sliding operation message, and then the redrawn window content is sent to an interface delivery process; the interface delivery process triggers screen refresh, and the redrawn window contents is output to the screen. During the screen refresh, a central processing unit (CPU) needs to be switched from a low power consumption mode to a high performance mode to respond to a sliding operation of the user. It may take hundreds of milliseconds from acquiring a sliding operation to improving performance of the CPU. This leads to a more pronounced hysteresis of the screen display relative to the sliding operation.

In order to speed up the response speed to the sliding operation on the touch screen, a touch screen acceleration technology is mainly used. Once a touch operation of the user on the screen is detected, the frequency of a CPU of the system is immediately increased, thereby increasing the response speed of the system. However, the above method cannot distinguish a click operation and a sliding operation of the user, therefore, the frequency of the CPU of the system will increase when the user clicks on the screen, resulting in loss of power consumption of the system.

Figure 1:
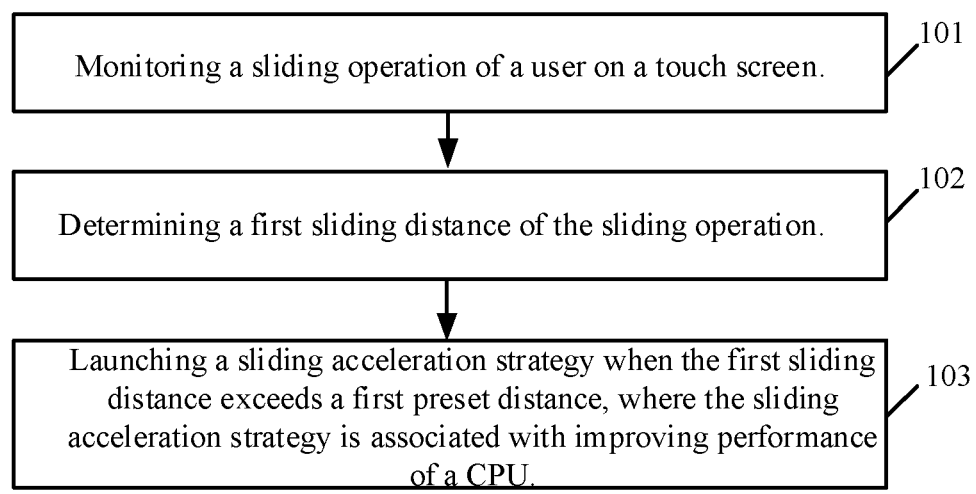
FIG. 1 is a schematic flow chart of a method for sliding response acceleration according to an implementation of the present disclosure.

Implementations of the present disclosure provide a method for sliding response acceleration. In this method, a sliding operation of a user on a touch screen is monitored, a first sliding distance of the sliding operation is determined, and a sliding acceleration strategy is launched when the first sliding distance exceeds a first preset distance. As illustrated in FIG. 1, the method includes the following operations.

At block 101, a sliding operation of a user on a touch screen is monitored.

In this implementation, the user can slide the screen through the touch screen, that is, the sliding operation of the user on the touch screen can be monitored through a touch sensor of a terminal device.

At block 102, a first sliding distance of the sliding operation is determined.

In this implementation, when the user performs the sliding operation on the touch screen, a position coordinate of a finger of the user on the touch screen can be obtained in real time, and the first sliding distance of the sliding operation can be determined according to a distance between the position coordinate and an initial position coordinate, that is a position coordinate corresponding to a start time of the sliding operation.

At block 103, a sliding acceleration strategy is launched when the first sliding distance exceeds a first preset distance, where the sliding acceleration strategy includes improving performance of a CPU. In other words, the sliding acceleration strategy is associated with improving CPU performance.

In this implementation, a sliding acceleration initiation distance may be set in advance as the first preset distance. The size of the first preset distance is theoretically as small as possible to meet the purpose of quickly responding to the sliding operation of the user. The size of the first preset distance can be determined through experiments, and numerical value representations for the size are not particularly limited.

When the finger of the user slides on the touch screen, if the first sliding distance exceeds the first preset distance, the sliding acceleration strategy is launched. The sliding acceleration strategy may include improving the performance of the CPU, for example, increasing the frequency of the CPU, increasing the number of CPU cores, or the like.

As one implementation, launching the sliding acceleration strategy is achieved as follows. A difference between the first sliding distance and the first preset distance is determined. A target sliding acceleration strategy corresponding to the difference is selected.

In an optional implementation, a corresponding relationship between different sliding acceleration strategies and distance ranges may be set in advance. For example, the distance ranges from small to large, and the level of the sliding acceleration strategy also goes from low to high to distinguish slow sliding operations and fast sliding operations of the user. When the first sliding distance exceeds the first preset distance, the difference between the first sliding distance and the first preset distance is calculated, so that the target acceleration strategy can be selected according to a distance range corresponding to the difference.

It should be noted, however, that rather than rely on the difference between the first sliding distance and the first preset distance, a correspondence between sliding distances and sliding acceleration strategies can be set in advance. In this situation, a sliding acceleration strategy can be selected based on a specific sliding distance directly, which can reduce the calculation work load of a processor and further improve the speed thereof.

As one implementation, after the sliding acceleration strategy is launched, the sliding acceleration strategy will be terminated once the finger of the user leaves the touch screen. Specifically, whether the finger of the user leaves the touch screen is monitored; the sliding acceleration strategy will be terminated once the finger of the user leaves the touch screen.

In this implementation, by determining the first sliding distance of the sliding operation of the user on the touch screen, and launching the sliding acceleration strategy when the first sliding distance exceeds the first preset distance, where the sliding acceleration strategy includes improving the performance of the CPU, it is possible to avoid improving performance of the CPU for any touch operation of the user, and power loss of a system can be reduced.

Figure 2:
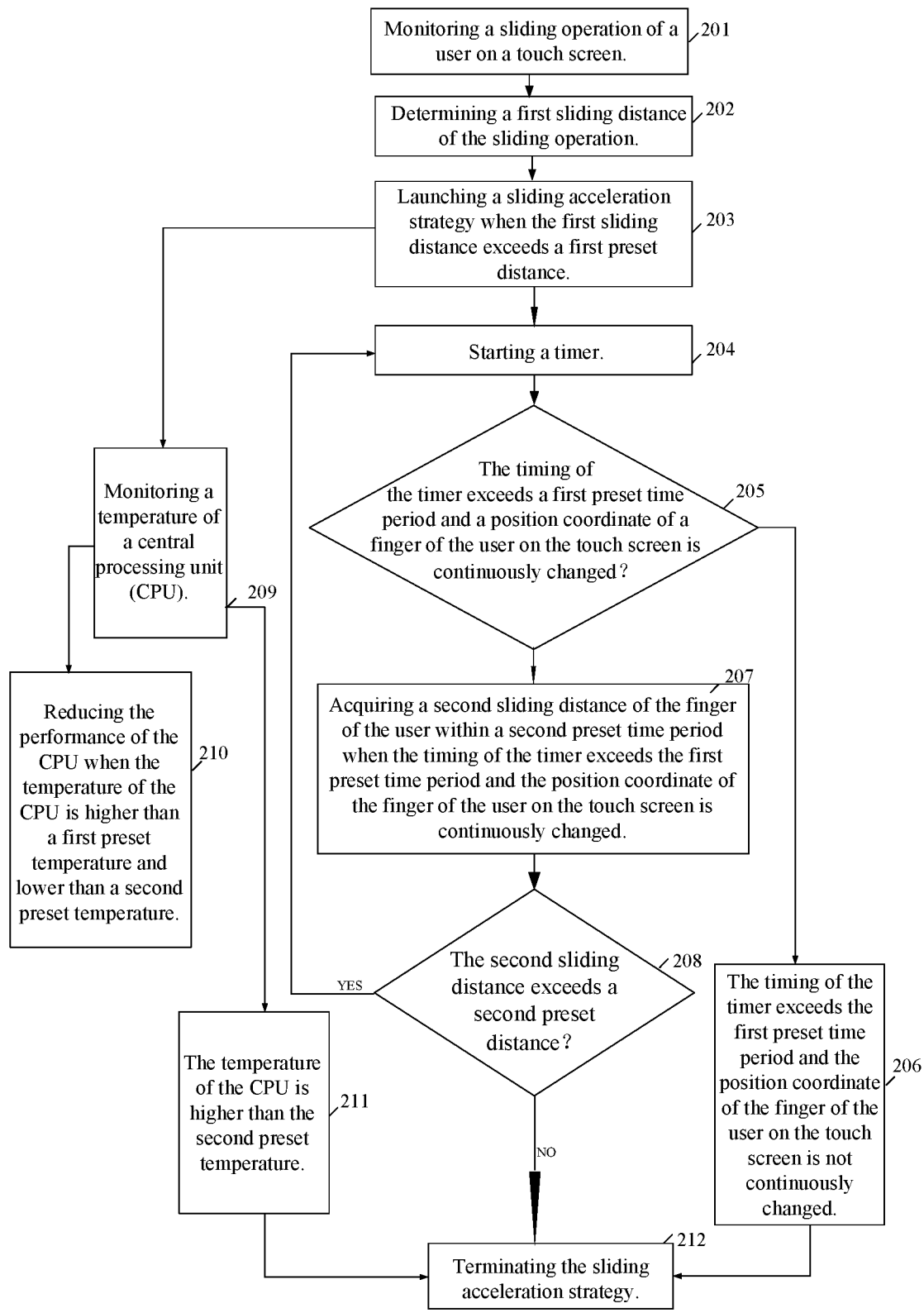
FIG. 2 is a schematic flow chart of a method for sliding response acceleration according to an implementation of the present disclosure.

FIG. 2 is a schematic flow chart illustrating a method for sliding response acceleration according to a second implementation of the present disclosure. As illustrated in FIG. 2, the method includes the following operations.

At block 201, a sliding operation of a user on a touch screen is monitored.

At block 202, a first sliding distance of the sliding operation is determined.

At block 203, a sliding acceleration strategy is launched when the first sliding distance exceeds a first preset distance.

At block 204, a timer is started.

At block 205, determine whether the timing of the timer exceeds a first preset time period and whether a position coordinate of a finger of the user on the touch screen is continuously changed. It should be noted that, the timer described herein is illustrative. Any other means which can determine the running time of the sliding acceleration strategy can be adopted. In implementation, the timer can be integrated into a processor or sensor such as a touch sensor, or can be configured as an independent and separate component. The expression of "whether a position coordinate of a finger of the user on the touch screen is continuously changed" can be comprehended as "whether the sliding operation is a continuous sliding operation", which can be determined according to position coordinates of two adjacent time points, such as an initial position coordinate of an initial time point and a current position coordinate of a current time point following the initial time point, as will be detailed below. Intervals between time points are not particularly restricted and can be set according to actual needs and an internal running environment of a terminal device.

At block 206, advance to operations at block 212 if the timing of the timer exceeds the first preset time period and the position coordinate of the finger of the user on the touch screen is not continuously changed.

In this implementation, a timeout period for the sliding acceleration strategy can be set as the first preset time. When the timing of the timer exceeds the first preset time period and the user is not performing a continuous sliding operation, the sliding acceleration strategy will be terminated.

As one implementation, whether the finger of the user is continuously sliding on the touch screen can be determined by determining whether the position coordinate of the finger of the user on the touch screen is continuously changed. For example, a flag can be set to indicate whether the finger of the user is continuously sliding on the touch screen. For example, the position coordinate of the finger of the user on the touch screen is monitored in real time and compared with a position coordinate of an adjacent time. When the position coordinate of the finger of the user and the position coordinate of the adjacent time are different, the flag is set to indicate that the finger of the user is continuously sliding on the touch screen. When the position coordinate of the finger of the user and the position coordinate of the adjacent time are the same, the flag is reset to indicate that the finger of the user is not continuously sliding on the touch screen. Therefore, whether the finger of the user is continuously sliding on the touch screen can be determined based on a value of the flag.

Whether execution of the sliding acceleration strategy exceeds the first preset time period can be determined according to the timing of the timer, and whether the finger of the user is continuously sliding on the touch screen can be determined by monitoring the value of the flag. Advance to operations at block 212 to terminate the sliding acceleration strategy when the timing of the timer exceeds the timeout time and the position coordinate of the finger of the user on the touch screen is not continuously changed.

At block 207, a second sliding distance of the finger of the user within a second preset time period is acquired when the timing of the timer exceeds the first preset time period and the position coordinate of the finger of the user on the touch screen is continuously changed.

At block 208, determine whether the second sliding distance exceeds a second preset distance, and advance to operations at block 212 if the second sliding distance does not exceed the second preset distance.

If the timing of the timer exceeds the first preset time period and the finger of the user is continuously sliding on the touch screen, a continuous sliding detection function is activated in response to a continuous sliding operation of the user.

As one implementation, a detection period of the continuous sliding detection function can be set as the second preset time. If the second sliding distance exceeds the second preset distance within the second preset time, the sliding acceleration strategy is continued, and returns to operations at block 204 to start the timer to re-timing; otherwise, advance to operations at block 212 to terminate the sliding acceleration strategy, where the second sliding distance may be greater than the first sliding distance for responding to the continuous sliding operation.

At block 209, a temperature of the CPU is monitored.

At block 210, the performance of the CPU is reduced when the temperature of the CPU is higher than a first preset temperature and lower than a second preset temperature.

At block 211, advance to operations at block 212 when the temperature of the CPU is higher than the second preset temperature.

In this implementation, the sliding acceleration strategy is launched at block 203, and then the temperature of the CPU is monitored at block 209. The performance of the CPU is reduced when the temperature of the CPU is higher than the first preset temperature and lower than the second preset temperature. Advance to operations at block 212 to terminate the sliding acceleration strategy when the temperature of the CPU is higher than the second preset temperature, where the first preset temperature and the second preset temperature may be set according to a temperature range that the CPU can withstand, thereby achieving reasonable protection of the CPU.

At block 212, terminate the sliding acceleration strategy.

Figure 3:
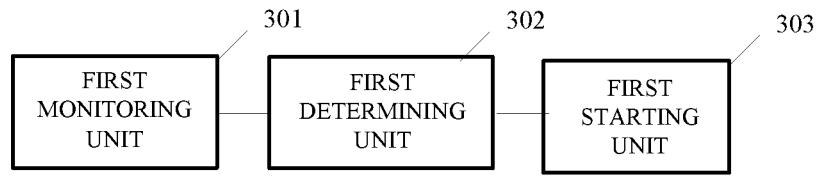
FIG. 3 is a schematic structural diagram illustrating a device for sliding response acceleration according to an implementation of the present disclosure.

Implementations of the present disclosure further provide a device for sliding response acceleration. As illustrated in FIG. 3, the device includes a first monitoring unit 301, a first determining unit 302, and a first starting unit 303. The first monitoring unit 301 and first determining unit 302 can be integrated into one component such as a processor or sensor. The first starting unit 303 can be a controller which has access to a memory for storing sliding acceleration strategies or has access to the sliding acceleration strategies per se.

The first monitoring unit 301 is configured to monitor a sliding operation of a user on a touch screen. The first determining unit 302 is configured to determine a first sliding distance of the sliding operation. The first starting unit 303 is configured to initiate a sliding acceleration strategy when the first sliding distance exceeds a first preset distance, where the sliding acceleration strategy includes improving performance of a central processing unit (CPU).

Figure 4:
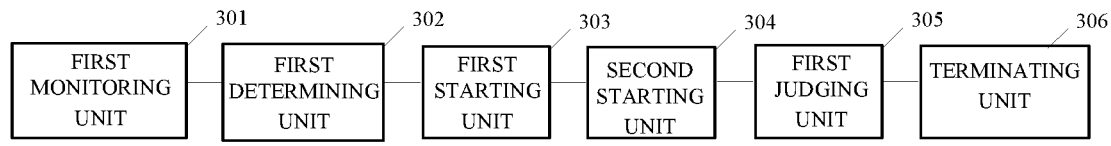
FIG. 4 is a schematic structural diagram illustrating a device for sliding response acceleration according to an implementation of the present disclosure.

As one implementation, after the first starting unit 303 launches the sliding acceleration strategy, whether a duration of execution of the sliding acceleration strategy is timed out can be detected. If the timeout occurs and an operation of the user on the touch screen is not a continuous sliding operation, the sliding acceleration strategy will be terminated. On the basis of the device illustrated in FIG. 3, as illustrated in FIG. 4, the device further includes a second starting unit 304, a first judging unit 305, and a terminating unit 306.

The second starting unit 304 is configured to start a timer.

The first judging unit 305 is configured to judge whether the timing of the timer exceeds a first preset time period and whether a position coordinate of a finger of the user on the touch screen is continuously changed.

The terminating unit 306 is configured to terminate the sliding acceleration strategy if the timing of the timer exceeds the first preset time period and the position coordinate of the finger of the user on the touch screen is not continuously changed.

Figure 5:
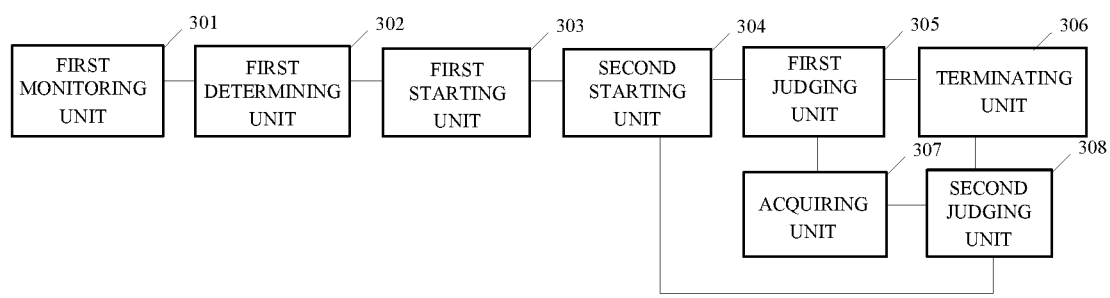
FIG. 5 is a schematic structural diagram illustrating a device for sliding response acceleration according to an implementation of the present disclosure.

As one implementation, if the timing of the timer exceeds the first preset time period and the operation of the user on the touch screen is a continuous sliding operation, the continuous sliding detection function will be activated. As illustrated in FIG. 5, the device further includes an acquiring unit 307 and a second judging unit 308.

The acquiring unit 307 is configured to acquire a second sliding distance of the finger of the user within a second preset time, when the timing of the timer exceeds the first preset time period and the position coordinate of the finger of the user on the touch screen is continuously changed.

The second judging unit 308 is configured to judge whether the second sliding distance exceeds a second preset distance, and to drive the terminating unit 306 to terminate the sliding acceleration strategy when the second sliding distance does not exceed the second preset distance.

As one implementation, when the second sliding distance exceeds the second preset distance, the sliding acceleration strategy will be continued, and the second starting unit 304 is driven to start the timer to re-timing.

Figure 6:
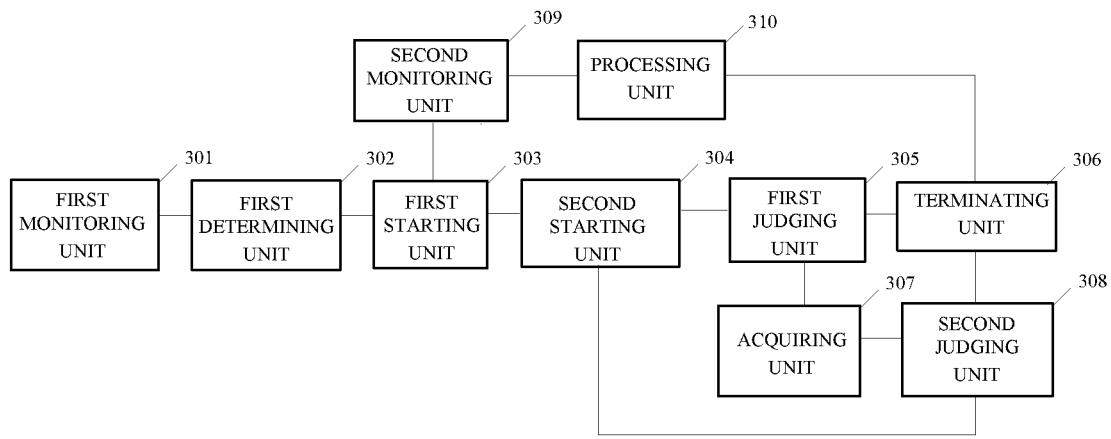
FIG. 6 is a schematic structural diagram illustrating a device for sliding response acceleration according to an implementation of the present disclosure.

As one implementation, after the first starting unit 303 launches the sliding acceleration strategy, performance of the CPU can be adjusted through monitoring a temperature of the CPU. As illustrated in FIG. 6, the device further includes a second monitoring unit 309 and a processing unit 310.

The second monitoring unit 309 is configured to monitor the temperature of the CPU.

The processing unit 310 is configured to reduce the performance of the CPU when the temperature of the CPU is higher than a first preset temperature and lower than a second preset temperature, and to drive the terminating unit 306 to terminate the sliding acceleration strategy when the temperature of the CPU is higher than the second preset temperature.

Figure 7:
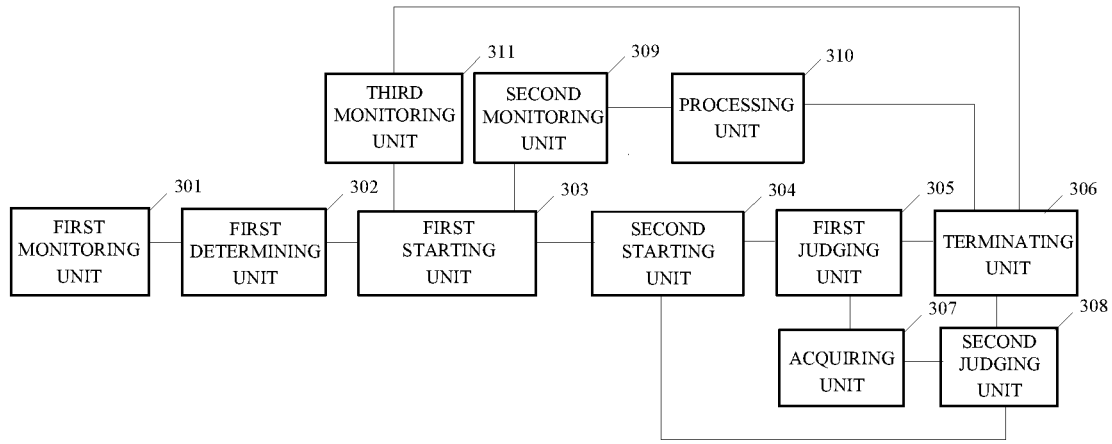
FIG. 7 is a schematic structural diagram illustrating a device for sliding response acceleration according to an implementation of the present disclosure.

As one implementation, when the finger of the user leaves the touch screen, the sliding acceleration strategy will be terminated. As illustrated in FIG. 7, the device further includes a third monitoring unit 311.

The third monitoring unit 311 is configured to monitor whether the finger of the user leaves the touch screen, and to drive the terminating unit 306 to terminate the sliding acceleration strategy once the finger of the user leaves the touch screen.

Figure 8:
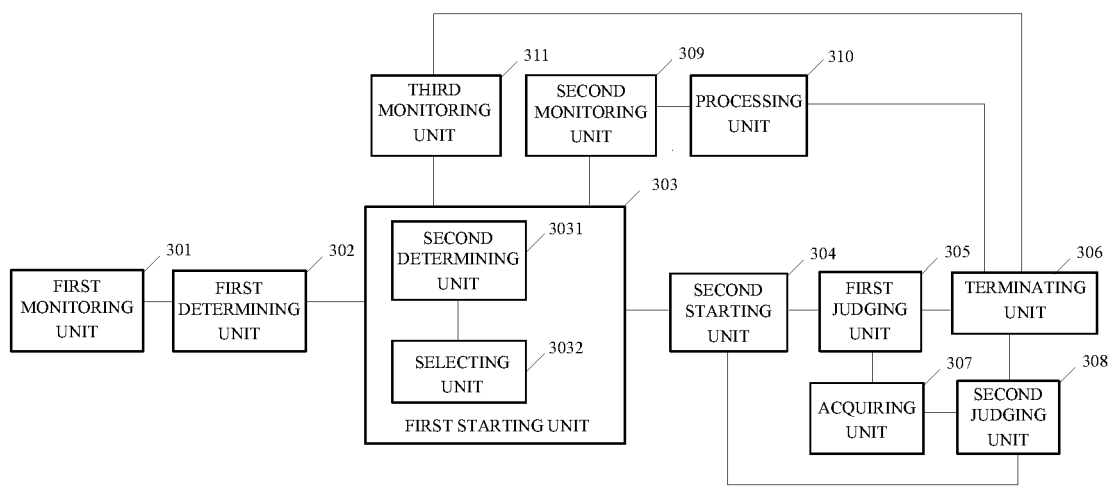
FIG. 8 is a schematic structural diagram illustrating a device for sliding response acceleration according to an implementation of the present disclosure.

As one implementation, as illustrated in FIG. 8, the first starting unit 303 includes a second determining unit 3031 and a selecting unit 3032.

The second determining unit 3031 is configured to determine a difference between the first sliding distance and the first preset distance. The selecting unit 3032 is configured to select a target sliding acceleration strategy corresponding to the difference.

Figure 9:
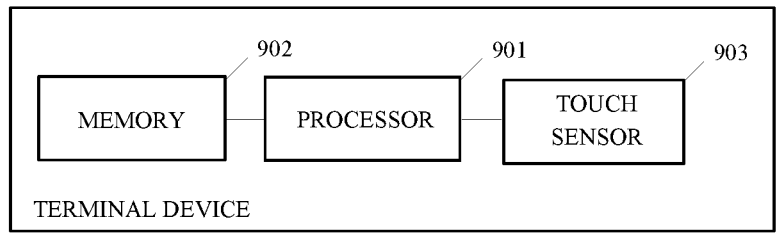
FIG. 9 is a schematic structural diagram illustrating a terminal device according to an implementation of the present disclosure.

Implementations of the present disclosure provide a terminal device. As illustrated in FIG. 9, the terminal device includes a processor 901 and a memory 902. The memory 902 can be configured as a cache required for data processing of the processor 901, and can also be configured to provide storage space for data invoked and result data obtained when the processor 901 performs data processing. In an implementation, the terminal device may further include a touch sensor 903.

The processor 901 is configured to invoke program codes stored in the memory 902 to carry out the following actions. A sliding operation of a user on a touch screen is monitored. A first sliding distance of the sliding operation is determined. A sliding acceleration strategy is launched when the first sliding distance exceeds a first preset distance, where the sliding acceleration strategy includes improving performance of a central processing unit (CPU).

As one implementation, after the sliding acceleration strategy is launched, the processor 901 is configured to invoke program codes stored in the memory 902 to carry out the following actions. A timer is started. Determine whether the timing of the timer exceeds a first preset time period and whether a position coordinate of a finger of the user on the touch screen is continuously changed. If the timing of the timer exceeds the first preset time period and the position coordinate of the finger of the user on the touch screen is not continuously changed, terminate the sliding acceleration strategy.

As one implementation, the processor 901 is further configured to invoke program codes stored in the memory 902 to carry out the following actions. A second sliding distance of the finger of the user within a second preset time period is acquired when the timing of the timer exceeds the first preset time period and the position coordinate of the finger of the user on the touch screen is continuously changed. Determine whether the second sliding distance exceeds a second preset distance. Terminate the sliding acceleration strategy if the second sliding distance does not exceed the second preset distance.

As one implementation, after the sliding acceleration strategy is launched, the processor 901 is configured to invoke program codes stored in the memory 902 to carry out the following actions. A temperature of the CPU is monitored. The performance of the CPU is reduced when the temperature of the CPU is higher than a first preset temperature and lower than a second preset temperature. Terminate the sliding acceleration strategy when the temperature of the CPU is higher than the second preset temperature.

As one implementation, after the sliding acceleration strategy is launched, the processor 901 is configured to invoke program codes stored in the memory 902 to carry out the following actions. Whether the finger of the user leaves the touch screen is monitored. Terminate the sliding acceleration strategy once the finger of the user leaves the touch screen.

As one implementation, the processor 901 is configured to invoke program codes stored in the memory 902 to initiate the sliding acceleration strategy. Specifically, a difference between the first sliding distance and the first preset distance is determined, and a target sliding acceleration strategy corresponding to the difference is selected.

Figure 10:
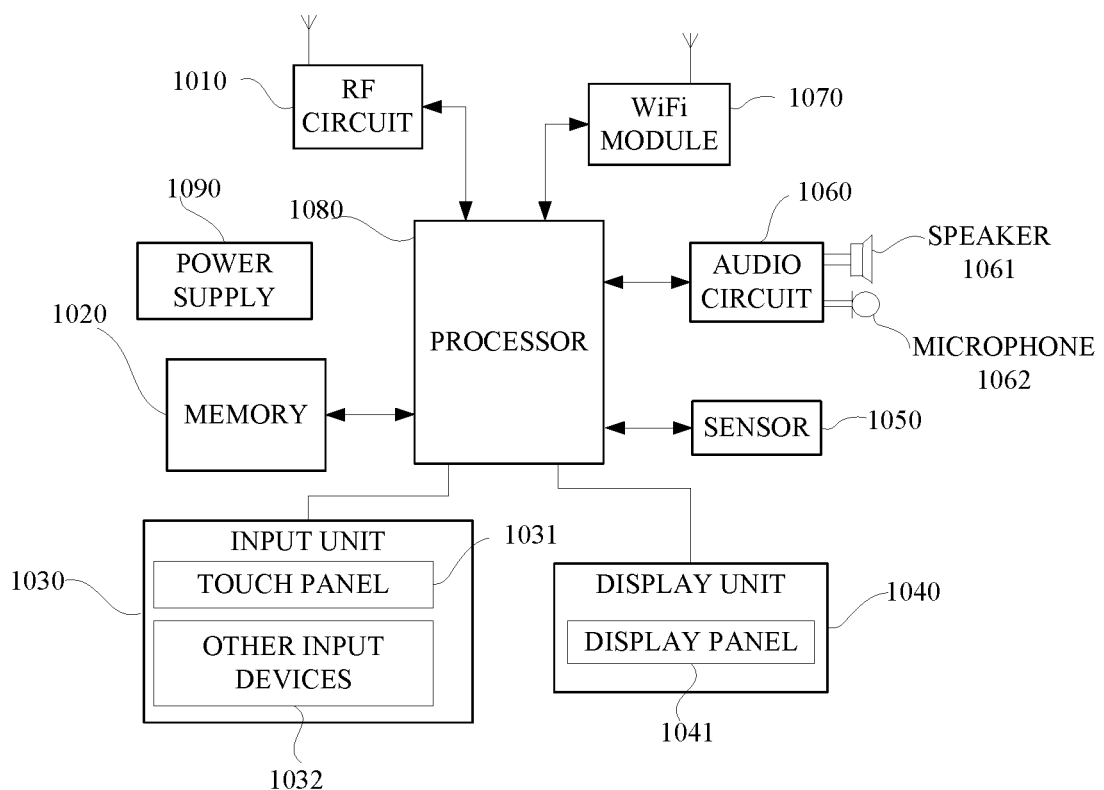
FIG. 10 is a schematic structural diagram illustrating a terminal device according to an implementation of the present disclosure.

An implementation of the present disclosure further provides another mobile terminal. As illustrated in FIG. 10, only parts related to the implementations of the present disclosure are illustrated for ease of description. For technical details not described, reference may be made to the method implementations of the present disclosure. The mobile terminal may be any terminal device, such as a mobile phone, a tablet computer, a personal digital assistant (PDA), a point of sale terminal (POS), an on-board computer, and the like. The following describes the mobile phone as an example of the mobile terminal.

FIG. 10 is a block diagram illustrating a partial structure of a mobile phone related to a mobile terminal according to an implementation of the present disclosure. As illustrated in FIG. 10, the mobile phone includes a radio frequency (RF) circuit 1010, a memory 1020, an input unit 1030, a display unit 1040, a sensor 1050, an audio circuit 1060, a wireless fidelity (Wi-Fi) module 1070, a processor 1080, a power supply 1090 and other components. The structure of the mobile phone illustrated in FIG. 10 does not constitute any limitation on the mobile phone. The mobile phone of the disclosure may include more or fewer components than illustrated, or may combine certain components or different components.

In the following, various components of the mobile phone will be described in detail with reference to FIG. 10.

The RF circuit 1010 is configured to transmit or receive information during transmission and reception of information or during a call. In an implementation, downlink information of a base station is received and then sent to the processor 1080 for processing. In addition, uplink data may be transmitted to the base station. Generally, the RF circuit 1010 includes but is not limited to an antenna, at least one amplifier, a transceiver, a coupler, a low noise amplifier (LNA), a duplexer, and the like. In addition, the RF circuit 1010 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 1020 is configured to store software programs and modules, and the processor 1080 is configured to execute various function applications and data processing of the mobile phone by running the software programs and the modules stored in the memory 1020. The memory 1020 mainly includes a program storing region and a data storing region. The program storing region may store an operating system, application programs (for example, a voice playing function, an image playing function, etc.) required for at least one function and so on. The data storing region may store data (for example, audio data, phone book, etc.) created according to use of the mobile phone, and so on. In addition, the memory 1020 may include a high-speed random access memory (RAM), and may further include a non-transitory memory such as at least one disk storage device, a flash device, or other transitory solid storage devices.

The input unit 1030 is configured to receive input digital or character information and generate key signal input associated with user setting and function control of the mobile phone. In one implementation, the input unit 1030 may include a touch panel 1031 and other input devices 1032. The touch panel 1031, also known as a touch screen, can collect touch operations of a user on or near the touch panel 1031 (such as an operation of the user using a finger, a stylus, or any other suitable object or accessory on the touch panel 1031 or near the touch panel 1031) and drive a corresponding connection device according to a preset program. For example, the touch panel 1031 may include a touch detection device and a touch controller. The touch detection device is configured to detect a touch orientation of the user and a signal brought by the touch operation, and to send the signal to the touch controller. The touch controller is configured to receive touch information from the touch detection device, convert the touch information into contact coordinates and then send the contact coordinates to the processor 1080, and receive and execute commands sent by the processor 1080. In addition, the touch panel 1031 may be implemented in various types such as resistive, capacitive, infrared, and surface acoustic waves. In addition to the touch panel 1031, the input unit 1030 may also include other input devices 1032. In one implementation, the other input devices 1032 may include, but not limit to, one or more of a physical key, a function key (such as a volume control key, a switch key, etc.), a trackball, a mouse, a joystick, and the like.

The display unit 1040 is configured to display information input by the user or information provided for the user or various menus of the mobile phone. The display unit 1040 may include a display panel 1041. In at least one implementation, the display panel 1041 may be in the form of a liquid crystal display (LCD), an organic light-emitting diode (OLED) and so on. Further, the touch panel 1031 may cover the display panel 1041. When the touch panel 1031 detects a touch operation on or near the touch panel 1031, the touch operation is transmitted to the processor 1080 to determine the type of a touch event, and then the processor 1080 provides a corresponding visual output on the display panel 1041 according to the type of the touch event. Although the touch panel 1031 and the display panel 1041 are illustrated as two separate components in FIG. 10 to realize the input and output functions of the mobile phone, in some implementations, the touch panel 1031 may be integrated with the display panel 1041 to implement the input and output functions of the mobile phone.

The mobile phone may also include at least one sensor 1050, such as a light sensor, a motion sensor, and other sensors. In one implementation, the light sensor may include an ambient light sensor and a proximity sensor, among which the ambient light sensor may adjust the brightness of the display panel 1041 according to ambient lights, and the proximity sensor may turn off the display panel 1041 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 1060, a speaker 1061, a microphone 1062 may provide an audio interface between the user and the mobile phone. The audio circuit 1060 may convert the received audio data into electrical signals and transfer the electrical signals to the speaker 1061; thereafter the speaker 1061 converts the electrical signals into sound signals to output. On the other hand, the microphone 1062 converts the received sound signals into electrical signals, which will be received and converted into audio data by the audio circuit 1060 to output. The audio data is then processed and transmitted by the processor 1080 via the RF circuit 1010 to another mobile phone for example, or, the audio data is output to the memory 1020 for further processing.

Wi-Fi belongs to a short-range wireless transmission technology. With aid of the Wi-Fi module 1070, the mobile phone may assist the user in E-mail receiving and sending, webpage browsing, access to streaming media and the like. Wi-Fi provides users with wireless broadband Internet access. Although the Wi-Fi module 1070 is illustrated in FIG. 10, it should be understood that the Wi-Fi module 1070 is not essential to the mobile phone and can be omitted according to actual needs without departing from the essential nature of the present disclosure.

The processor 1080 is a control center of the mobile phone. It uses various interfaces and lines to connect various parts of the whole mobile phone, runs or executes software programs and/or modules stored in the memory 1020, and calls data stored in the memory 1020 to perform various functions of the mobile phone and process data, thereby monitoring the mobile phone. In at least one implementation, the processor 1080 may include one or more processing units; for example, the processor 1080 may integrate an application processor and a modem processor, where the application processor mainly handles the operating system, the user interface, the application programs, and so on, and the modem processor mainly processes wireless communication. It will be appreciated that the above-mentioned modem processor may not be integrated into the processor 1080.

The mobile phone also includes the power supply 1090 (e.g., a battery) that supplies power to various components. For instance, the power supply 1090 may be logically connected to the processor 1080 via a power management system to enable management of charging, discharging, and power consumption through the power management system.

Although not illustrated, the mobile phone may include a camera, a Bluetooth module, etc., and the disclosure will not elaborate herein.

The methods of the foregoing implementations can be realized based on the structure of the mobile phone. The sensor 1050 or the touch panel 1031 can be used as a device for acquiring a sliding distance.

It should be noted that, in above implementations of the device for accelerating response to sliding, each unit included is merely divided according to function logic, but it is not limited to the above division, as long as the corresponding function can be achieved. In addition, the specific names of each functional unit are only for convenience of distinguishing each other and are not used to limit the protection scope of the present disclosure.

In addition, those of ordinary skill in the art may understand that implementing all or part of the operations in the foregoing method implementations may be accomplished through programs to instruct the relevant hardware to complete, and the corresponding programs may be stored in a computer readable storage medium. The storage medium may be a read-only memory, Disk or compact disc (CD), and so on.

What is claimed is:

1. A method of sliding response acceleration, comprising:
monitoring a sliding operation of a finger of a user on a touch screen;
determining a first sliding distance of the sliding operation;
launching a sliding acceleration strategy when the first sliding distance exceeds a first preset distance, the sliding acceleration strategy including improving performance of a central processing unit (CPU), wherein the improving performance of the CPU comprises performing at least one of increasing a frequency of the CPU or increasing a number of CPU cores;
in response to determining that the first sliding distance exceeds the first preset distance, monitoring a temperature of the CPU;
when the temperature of the CPU is higher than a first preset temperature and lower than a second preset temperature, reducing the performance of the CPU;
terminating the target sliding acceleration strategy when the sliding operation continues after a first preset time period and a second sliding distance of the sliding operation within a second preset time period after elapse of the first preset time period is determined to be less than or equal to a second preset distance, wherein the first preset time period is a timeout period of performing the sliding acceleration strategy and has elapsed after the launching the sliding acceleration strategy; and
terminating the target sliding acceleration strategy when the temperature of the CPU is higher than the second preset temperature.

2. The method of claim 1, further comprising:
obtaining a position coordinate of the finger of the user on the touch screen; and
determining whether the sliding operation continues based on a comparison between the position coordinate and a previous position coordinate of an adjacent time point.

3. The method of claim 1, further comprising:
setting a correspondence between sliding acceleration strategies and distance ranges, wherein a larger distance range corresponds to a sliding acceleration strategy having a higher level.

4. The method of claim 3, wherein the launching the sliding acceleration strategy comprises:
selecting, according to the correspondence and a difference between the first sliding distance and the first preset distance, one of the sliding acceleration strategies as a target sliding acceleration strategy corresponding to the difference between the first sliding distance and the first preset distance.

5. The method of claim 1, wherein the determining the first sliding distance of the sliding operation comprises:
obtaining a position coordinate of the finger of the user on the touch screen; and
determining the first sliding distance of the sliding operation according to a distance between the position coordinate of the finger of the user and an initial position coordinate.

6. The method of claim 1, further comprising:
continuing performing of the sliding acceleration strategy upon determining that the second sliding distance exceeds the second preset distance.

7. A terminal device, comprising:
at least one processor; and
a computer readable storage, coupled to the at least one processor and storing at least one computer executable instruction thereon which, when executed by the at least one processor, cause the at least one processor to:
monitor a sliding operation of a finger of a user on a touch screen;
determine a first sliding distance of the sliding operation;
launch a sliding acceleration strategy when the first sliding distance exceeds a first preset distance, the sliding acceleration strategy comprising improving performance of a central processing unit (CPU), wherein the improving performance of the CPU comprises performing at least one of increasing a frequency of the CPU or increasing a number of CPU cores;
in response to determining that the first sliding distance exceeds the first preset distance, monitor a temperature of the CPU;
when the temperature of the CPU is higher than a first preset temperature and lower than a second preset temperature, reduce the performance of the CPU;
terminate the target sliding acceleration strategy when the sliding operation continues after a preset time period and a second sliding distance of the sliding operation within a second preset time period after elapse of the first preset time period is determined to be less than or equal to a second preset distance, wherein the first preset time period is a timeout period of performing the sliding acceleration strategy and has elapsed after the launching the sliding acceleration strategy; and
terminate the target sliding acceleration strategy when the temperature of the CPU is higher than the second preset temperature.

8. The terminal device of claim 7, wherein when executed by the at least one processor, the at least one computer executable instruction further causes the at least one processor to:
- select, according to a difference between the first sliding distance and the first preset distance and a correspondence between sliding acceleration strategies and distance ranges, one of the sliding acceleration strategies as a target sliding acceleration strategy corresponding to the difference.

9. The terminal device of claim 7, wherein when executed by the at least one processor, the at least one computer executable instruction further causes the at least one processor to:
- obtain a position coordinate of the finger of the user on the touch screen; and
- determine whether the sliding operation continues based on a comparison between the position coordinate and a previous position coordinate of an adjacent time point.

10. The terminal device of claim 7, wherein the at least one computer executable instruction that causes the at least one processor to determine the first sliding distance of the sliding operation causes the at least one processor to:
- obtain a position coordinate of the finger of the user on the touch screen; and
- determine the first sliding distance of the sliding operation according to a distance between the position coordinate of the finger of the user and an initial position coordinate.

11. The terminal device of claim 7, wherein when executed by the at least one processor, the at least one computer executable instruction further causes the at least one processor to:
- continue performing of the sliding acceleration strategy upon determining that the second sliding distance exceeds the second preset distance.

12. A non-transitory computer-readable storage medium storing a computer program which, when executed by a processor, causes the processor to:
- monitor a sliding operation of a finger of a user on a touch screen;
- acquire a position coordinate of the finger on the touch screen in real-time;
- determine a first sliding distance of the sliding operation according to the acquired position coordinate;
- launch a sliding acceleration strategy when the first sliding distance exceeds a first preset distance, the sliding acceleration strategy comprising improving performance of a central processing unit (CPU), wherein the improving performance of the CPU comprises performing at least one of increasing a frequency of the CPU or increasing a number of CPU cores;
- in response to determining that the first sliding distance exceeds the first preset distance, monitor a temperature of the CPU;
- when the temperature of the CPU is higher than a first preset temperature and lower than a second preset temperature, reduce the performance of the CPU;
- terminate the target sliding acceleration strategy when the sliding operation continues after a first preset time period and a second sliding distance of the sliding operation within a second preset time period after elapse of the first preset time period is determined to be less than or equal to a second preset distance, wherein the first preset time period is a timeout period of performing the sliding acceleration strategy and has elapsed after the launching the sliding acceleration strategy; and
- terminate the target sliding acceleration strategy when the temperature of the CPU is higher than the second preset temperature.

13. The non-transitory computer-readable storage medium of claim 12, wherein the compute program further causes the processor to:
- determine whether the sliding operation continues according to position coordinates acquired at two adjacent time points.

14. The non-transitory computer-readable storage medium of claim 12, wherein the computer program further causes the processor to:
- set a correspondence between sliding acceleration strategies and distance ranges, wherein a larger distance range corresponds to a sliding acceleration strategy having a higher level.

15. The non-transitory computer-readable storage medium of claim 14, wherein the computer program executed by the processor to launch the sliding acceleration strategy causes the processor to:
- select, according to the correspondence and a difference between the first sliding distance and the first preset distance, one of the sliding acceleration strategies as a target sliding acceleration strategy corresponding to the difference between the first sliding distance and the first preset distance.

16. The non-transitory computer-readable storage medium of claim 12, wherein the computer program further causes the processor to:
- continue performing of the sliding acceleration strategy upon determining that the second sliding distance exceeds the second preset distance.

* * * * *